Patented Sept. 9, 1941

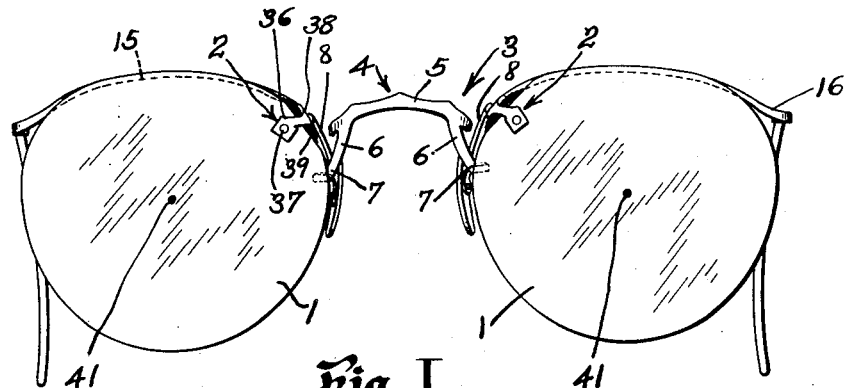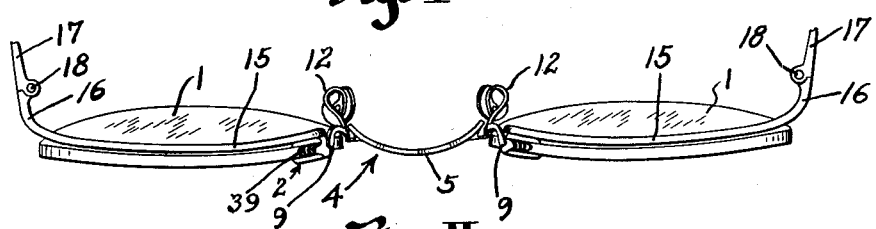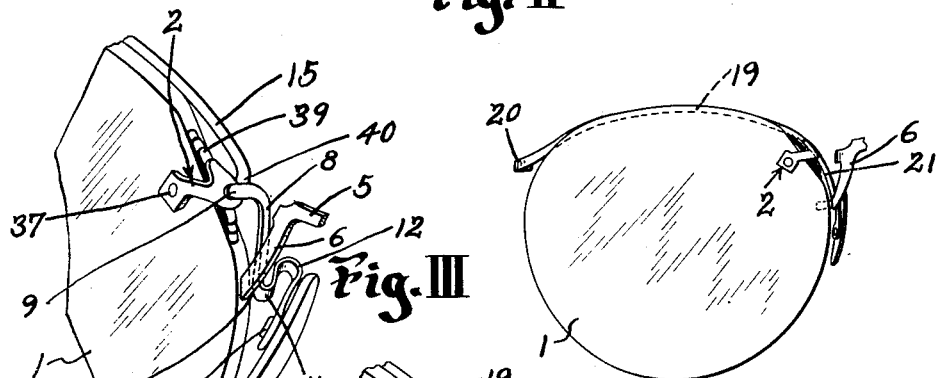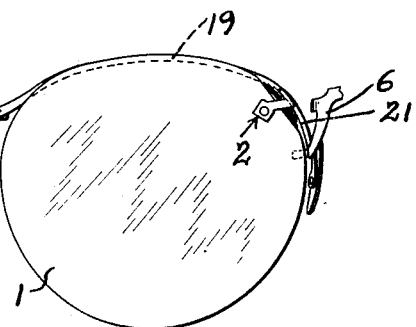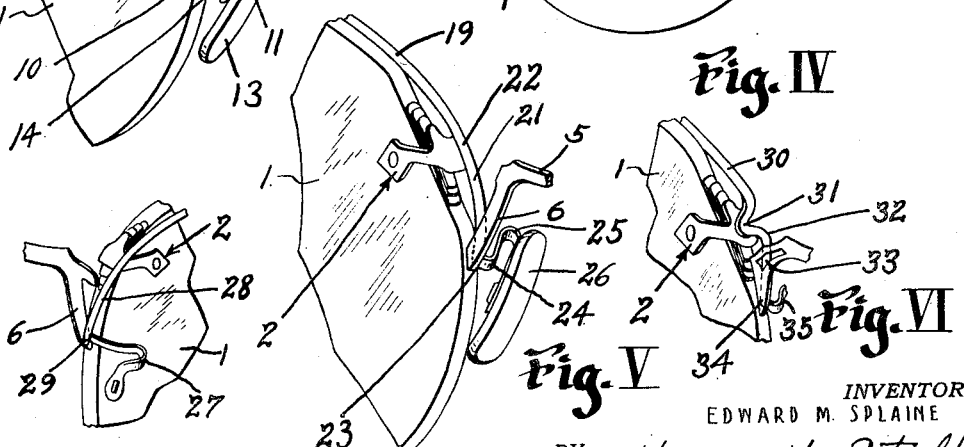
INVENTOR.
EDWARD M. SPLAINE
BY Harry H. Styll
ATTORNEY.

2,255,687

UNITED STATES PATENT OFFICE 2,255,687

OPHTHALMIC MOUNTING

Edward M. Splaine, Southbridge, Mass., assignor to American Optical Company, Southbridge, Mass., a voluntary association of Massachusetts Application June 20, 1939, Serial No. 280,134

2 Claims. (Cl. 88—41)

This invention relates to improvements in ophthalmic mountings and has particular reference to a spectacle type mounting.

One of the principal objects of the invention is to provide an ophthalmic mounting with a supporting structure for the lenses constituting a bridge member, nose pads and relatively long and slender temple supports shaped to fit about the upper contour edges of the lenses so arranged that the bridge and associated nose pads may be adjusted to the requirements of the wearer and the distance between the lenses may be altered without changing the bridge and nose pad adjustment and which will permit adjustment of the temples to the requirement of the wearer independently of said previous adjustments.

Another object of the invention is to provide an ophthalmic mounting of the above character whereby the lenses will be resiliently supported so as to be relieved from shock and strain during the use of the mounting.

Another object is to provide a supporting structure for an ophthalmic mounting of the above character whereby the major part of the supporting structure will be positioned above the useful field of side vision.

Another object is to provide a mounting of the above character with adjustable portions between the lens strap connections and the bridge member whereby the distance between the lenses may be altered independently and without disturbing the adjustment of the other parts of the mounting.

Other objects and advantages of the invention will become apparent from the following description taken in connection with the accompanying drawing and it will be apparent that many changes may be made in the details of construction and arrangement of parts shown and described without departing from the spirit of the invention as expressed in the accompanying claims. I, therefore, do not wish to be limited to the exact details shown and described as the preferred forms only have been given by way of illustration.

Referring to the drawing:

Fig. I is a front elevation of an ophthalmic mounting embodying the invention;

Fig. II is a top plan view of the mounting shown in Fig. I;

Fig. III is a partial perspective view of the bridge, nose pad and lens strap assembly with the lens as shown in Figs. I and II;

Fig. IV is a partial front elevation of a modified form of the invention;

Fig. V is a partial perspective view of the modified construction of Fig. IV;

Fig. VI is a view generally similar to Fig. V showing a further modification; and Fig. VII is a rear perspective view of a further modification.

Much difficulty has been encountered in ophthalmic mountings of the type having the greater part of their supporting structure for the lenses located above the useful field of vision in that the distance between the lenses could not be altered independently of the nose pad and bridge adjustments whereby the said bridge and nose pads can first be adjusted to the requirements of the wearer and the distance between the lenses thereafter varied without changing said bridge and nose pad adjustments.

The essence of the present invention, therefore, resides primarily in the provision of a supporting structure for the lenses of an ophthalmic mounting, of the above character, whereby the bridge, temples and distance between the lenses, may be adjusted independently of each other to meet the facial requirements of different individuals whereby a single mounting may be adjusted to several different individuals and thereby eliminate the necessity of providing a plurality of mountings in graded sizes.

Referring more particularly to the drawing whereby like characters of reference designate like parts throughout the several views the device embodying the invention, as illustrated in Figs. I to III inclusive, comprises broadly a pair of lenses 1 secured by lens straps 2 to a supporting structure 3. The supporting structure comprises a bridge member 4 having a central arch portion 5 and depending side portions 6. The central arch portion 5, as illustrated in Fig. II, is cupped so as to fit about the nose of the wearer and the said depending portions 6 extend downproximity with the adjacent edges of the lenses. and have end portions 7 shaped to lie in close proximity with the adjacent edges of the lenses.

The lens straps 2 are preferably located at a high position on the nasal sides of the lenses, as illustrated in Fig. I. The said depending portions 6 of the bridge member are secured to the lens straps 2 by adjustable connecting members 8. The said adjustable members 8, as illustrated in Fig. III, have a forwardly extending portion 9 secured to the lens straps 2 as by soldering, welding or the like. The adjustable members 8 are secured adjacent their lower ends 10 in the rear of the depending portions 6 of the bridge. As illustrated in Fig. III the members 8 curve rearwardly at 11 to form nose pad supporting arms 12 to which suitable nose bearing pads 13 may be either rigidly or pivotally attached, as illustrated at 14. In this particular instance, the nose pad supporting arm 12 and portion 8 are integral with each other and the lower ends of the depending portions 6 are secured to the adjustable members 8 adjacent the rearwardly extending loop portions 11. The said loop portions 11 and point of attachment thereof are preferably located in the rear of the depending portions 6 when the mounting is viewed from the front. The said supporting structure further constitutes relatively long and slender bar-like members 15 shaped to follow substantially the upper contour edges of the lenses in the rear of the plane of the upper peripheral edges of said lenses and terminate in rearwardly extending portions 16 to which suitable temples 17 are pivotally attached, as illustrated at 18.

The said central arch portion 5 and relatively long and slender portions 15 may be formed of rigid, ductile, or resilient material and may possess one or more of said characteristics.

It is particularly pointed out that the rearwardly extending portions 16 are preferably located above the useful field of side vision or above the pupil of the eyes when the mounting is in position of use on the face.

Although the adjustable portions 8 have been shown and described as being formed separately of the relatively long and slender bar-like portions 15 the said mounting may be provided with bar-like portions 19, as illustrated in Figs. IV and V, shaped to follow the upper contour shape of the lenses and terminating adjacent the outer temporal ends in rearwardly extending temple connections 20 and provided on the nasal sides thereof with continuously extending portions 21 forming adjustable means simulating the adjustable means 8. In this instance, the long and slender bar-like members 19 are secured to the lens straps or holding means 2 intermediate the portions 19 and 21 thereof, as illustrated at 22. The said portions 21 continue downwardly to a point of attachment 23 preferably secured to the rear of the depending portions 6 of the bridge and thence turn rearwardly, as illustrated at 24, to adjustable nose pad supporting arms 25 to which suitable nose pads 26 may be rigidly or pivotally attached. In this particular instance, the attachment 22 which may be a solder or welded connection is preferably to the rear of the lens strap 2. Instead of forming the nose pad supporting arm 25 and adjustable portion 21 integral with each other, the nose pad supporting arm 27, such as illustrated in Fig. VII, may be formed separate of the adjustable portion 28 simulating the portion 21 in which instance the meeting ends 29 of said portions 27 and 28 may be secured to the rear of the depending portions 6 of the bridge.

A further modification is illustrated in Fig. VI wherein a relatively long and slender portion 30 shaped to follow substantially the upper contour edge of the lens is provided with a forwardly extending loop 31 and which turns rearwardly at 32 and then extends downwardly with an integral adjustable portion 33 to which the lower end 34 of the depending portion of the bridge is attached. The said portion 33 then extends rearwardly, as illustrated at 35, to provide an adjustable nose pad supporting arm. It is to be understood that the arm 35 may be formed separately if desired. In all of the above constructions the lens strap or lens holding means 2 has portions 36 overlying a side surface of the lens and pivotally connected, as illustrated at 37, to said lens. The said lens straps are also provided with a portion 38 shaped to overlie the edge of the lens and provided with a plurality of superimposed resilient members 39 extending outwardly of the opposed ends of the portion 38 overlying the edge of the lens to resiliently support the lens against shock and strain during the use of the mounting. Although the relatively long and slender temple supporting portions 15, 19 or 30, as the case may be, are described as being shaped to follow the upper contour edges of the lenses substantially in the rear of the plane of said edges, they may be formed to follow said edges in the plane of the lenses or in a plane in the front of said lenses.

It is to be understood that lens straps of the type rigidly connected with the lenses may be used if desired. The preferable arrangement, however, is to provide resilient lens edge engaging spring members 39, as particularly illustrated in Fig. III. The lens strap may be of the type having one or two ear members overlying the side surfaces of the lens.

Referring more particularly to Fig. III it is to be noted that the end 40 of the relatively long and slender temple support 15 may be secured to the rear or edge surface of the lens strap or only to the adjustable means 8 adjacent the strap or may have portions thereof secured to the strap and also to the adjacent forwardly extending portion 9 of the means 8, as by soldering, welding or the like.

From the above arrangement, it is particularly pointed out that the bridge 4 and nose pad supporting arms may be adjusted to fit the nose of the wearer and that the distance between the centers 41 of the lenses may be increased or decreased by adjusting the members 8, 21 or 28, as the case may be, in a sidewise direction. The inset or outset of the bridge relative to the plane of the lenses may be varied by adjusting the members 8 or other similar members inwardly or outwardly. It is to be noted that the inset or outset may be made without changing the previous adjustments of the bridge member to the nasal requirements of the wearer. It is also to be noted that the adjustment of the members 8 or similar members does not change the relation of the relatively long and slender bar-like members 15 with the edges of the lenses.

The distance between the temples 17 may be increased or decreased by bending the rearwardly extending portions 16 inwardly or outwardly. The angular disposition of the temples when extended relative to the plane of the lenses may also be varied by bending the rearwardly extending portions 16 upwardly or downwardly. The long and slender temple supports and associated depending adjustable portions 8, 21 or 28, may be secured in desired relation to the lens strap or lens holding means 2 and may also be secured in any desired relation with the lower ends of the depending side portions of the bridge member although it is preferable that the adjustable portions 8 or the like be secured to the lower ends of the side portions preferably in the rear of said depending portions so that the point of attachment will be substantially invisible when the mounting is viewed from the front.

From the foregoing description it will be seen that simple, efficient and economical means have been provided for accomplishing all of the objects and advantages of the invention.

Having described my invention, I claim:

1. A supporting structure for the lenses of an ophthalmic mounting comprising a bridge member having a central arch portion and relatively long depending side portions, lens holding means shaped to be secured to a pair of lenses adjacent the upper nasal sides of said lenses and having a portion shaped to overlie a side surface of the lenses and a portion shaped to overlie an edge surface of said lenses, relatively long and slender temple supports each having a portion shaped to follow substantially the upper contour shape of each respective lens and terminating on the outer temporal ends thereof in temple hinge connections located adjacent the outer upper temporal sides of the lenses when in position thereon and having, on the nasal sides thereof, an integral intermediate attachment portion comprising a forwardly looped portion secured to the portion of the lens holding means shaped to overlie the edge of the lens and having a portion curving rearwardly and downwardly to produce an integral depending portion following substantially the adjacent contour edge of the lens, said depending portion being secured adjacent the lower end thereof to the lower end of a side portion of the bridge member, and a nose pad supporting portion extending rearwardly from adjacent said point of attachment of said side portion of the bridge member to said depending portion of the long and slender temple support and terminating in a nose pad supporting end, said portion of the long and slender supports shaped to follow substantially the upper contour shape of the lenses and said integral depending portion adjacent the nasal sides of the lenses having the major portions thereof disposed in the rear of the plane of the lenses with the lower ends of said integral depending portions of the temple supports and said nose pad supporting arms lying in the rear of the depending side portions of the bridge member when the lens holding means is in position on the lenses.

2. In a device of the character described, the combination of a pair of lenses and a lens supporting structure for said lenses, said lens supporting structure comprising a bridge member having a central arch portion and relatively long depending side portions, lens holding means secured to the lenses adjacent the upper nasal sides of said lenses and having a portion overlying a side surface of the lenses and a portion overlying an edge surface of said lenses, relatively long and slender temple supports each having a portion shaped to follow substantially the upper contour shape of each respective lens and terminating on the outer temporal ends thereof in temple hinge connections located adjacent the outer upper temporal sides of the lenses and having on the nasal sides thereof, an integral intermediate attachment portion comprising a forwardly looped portion secured to the portion of the lens holding means overlying the edge of the lens and having a portion curving rearwardly and downwardly to produce an integral depending portion following substantially the adjacent contour edge of the lens, said depending portion being secured adjacent the lower end thereof to the lower end of a side portion of the bridge member, and a nose pad supporting portion extending rearwardly from adjacent said point of attachment of said side portion of the bridge member to said depending portion of the long and slender temple support and terminating in a nose pad supporting end, said portion of the long and slender supports shaped to follow substantially the upper contour shape of the lenses and said integral depending portion adjacent the nasal sides of the lenses having the major portion thereof disposed in the rear of the plane of the lenses with the lower ends of said integral depending portions of the temple supports and said nose pad supporting arms lying in the rear of the depending side portions of the bridge member with the integral forwardly extending intermediate loop portion which is secured to the edge portion of the lens holding means overlying the adjacent portion of the edge of the lens.

EDWARD M. SPLAINE.